United States Patent [19]

Koehnen

[11] 4,030,625
[45] June 21, 1977

[54] LOADER ATTACHMENT FOR HANDLING LOGS, BALES AND THE LIKE

[76] Inventor: Edward L. Koehnen, Akeley, Minn. 56433

[22] Filed: Aug. 26, 1976

[21] Appl. No.: 717,949

[52] U.S. Cl. .......................... 214/147 G; 294/115; 294/118

[51] Int. Cl.² .......................................... B66C 1/62

[58] Field of Search ......... 214/147 G, 77 R, 147 R; 294/115, 118, 119, 111

[56] References Cited

UNITED STATES PATENTS

| | | | |
|---|---|---|---|
| 3,051,521 | 8/1962 | Skowron | 294/119 X |
| 3,456,822 | 7/1969 | Smith | 214/147 G |

Primary Examiner—Robert J. Spar
Assistant Examiner—George F. Abraham
Attorney, Agent, or Firm—Burd, Braddock & Bartz

[57] ABSTRACT

Hydraulically activated, spaced apart, front end loader support arms extend from a tractor. A loader attachment includes a vertically extending frame pivotally attached to the support arms forwardly of the tractor. This vertical frame includes a main horizontal frame support bar pivotally mounted in outer ends of the support arms, and a pair of open vertical guides which extend downwardly from the frame support bar. A horizontal hook support bar extends through the vertical guides and pivotally supports central portions of the two jaw-forming hooks at each end thereof. Upper ends of each of these hooks are pivotally connected to links which are pivotally connected to the frame support bar. A vertical hook support bar lifting strap extends integrally up from the hook support bar and is in sliding relationship with respect to the frame support bar. To load, means is provided to raise the lifting strap with respect to the main frame, thus to cause the jaws to be opened. The support arms are then lowered to encompass a log to be lifted. The lifting strap is allowed to drop by gravity to cause the hooks of the jaws to close on the object to be lifted, and the loader support arms are lifted to raise the log from the ground. To unload, the support arms are lowered, and when the log comes in touch with the ground, the further progess of the loader support arms in downward direction will cause the jaws to be released.

6 Claims, 6 Drawing Figures

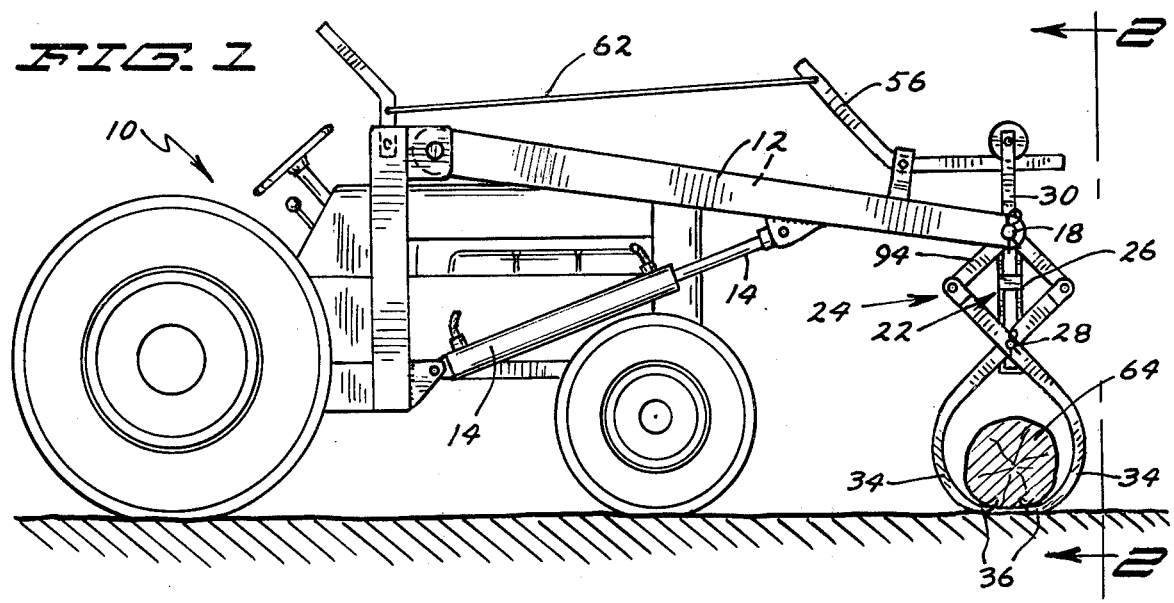
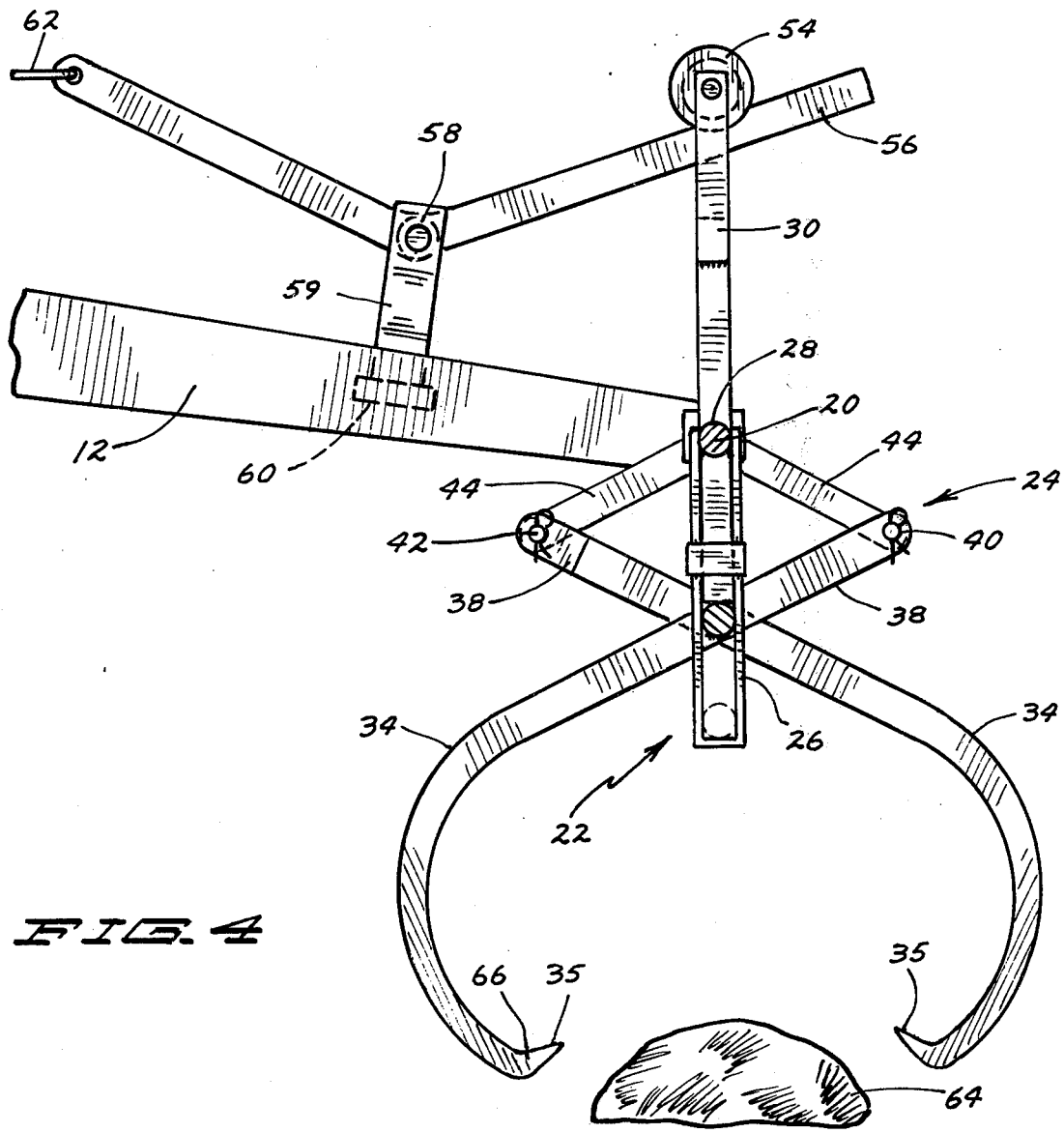

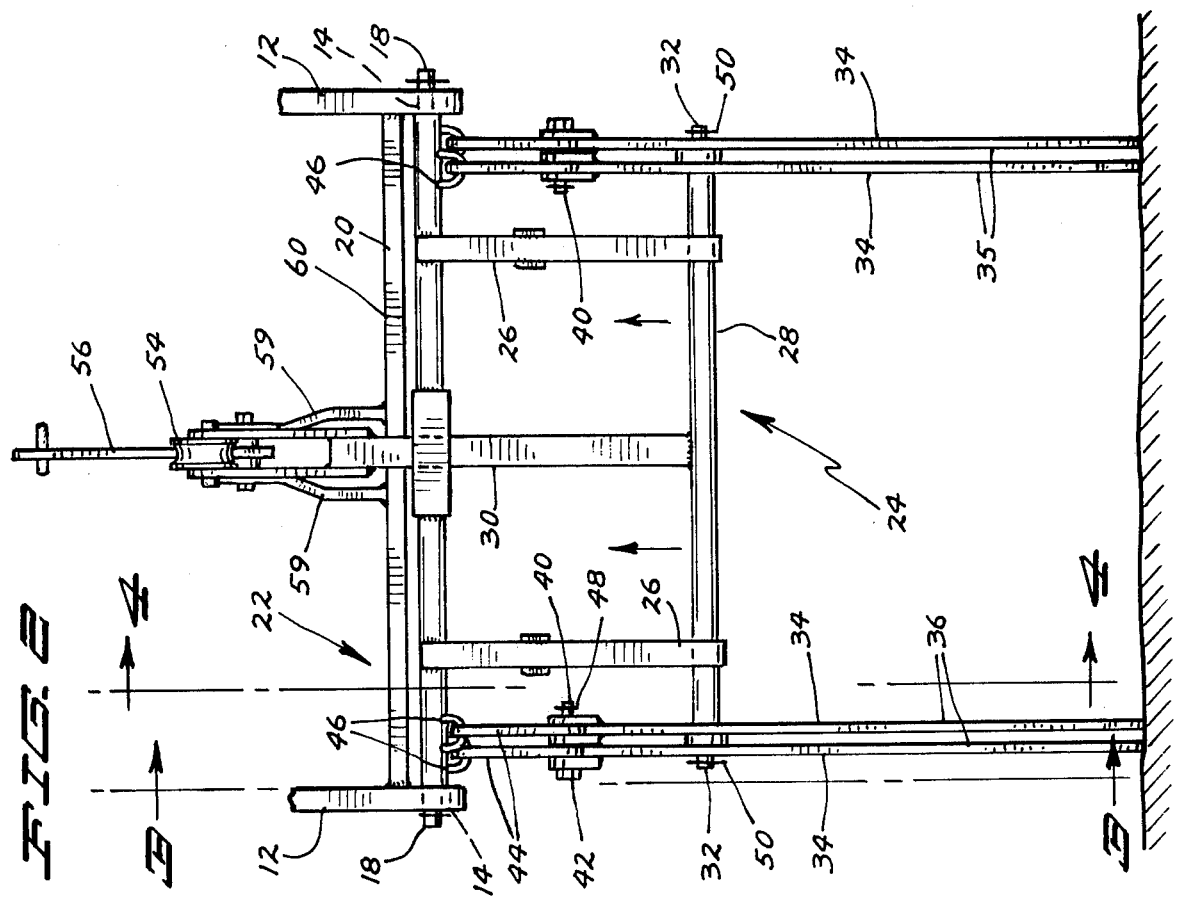
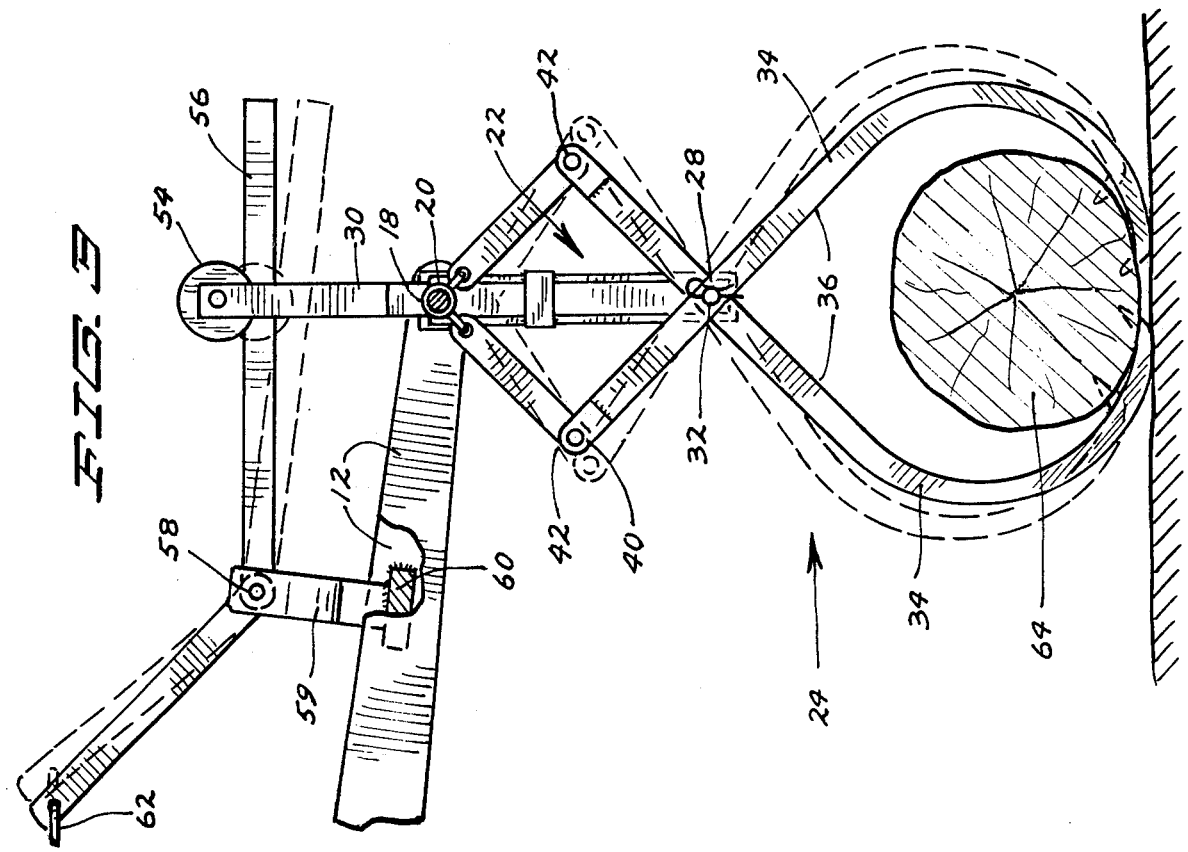

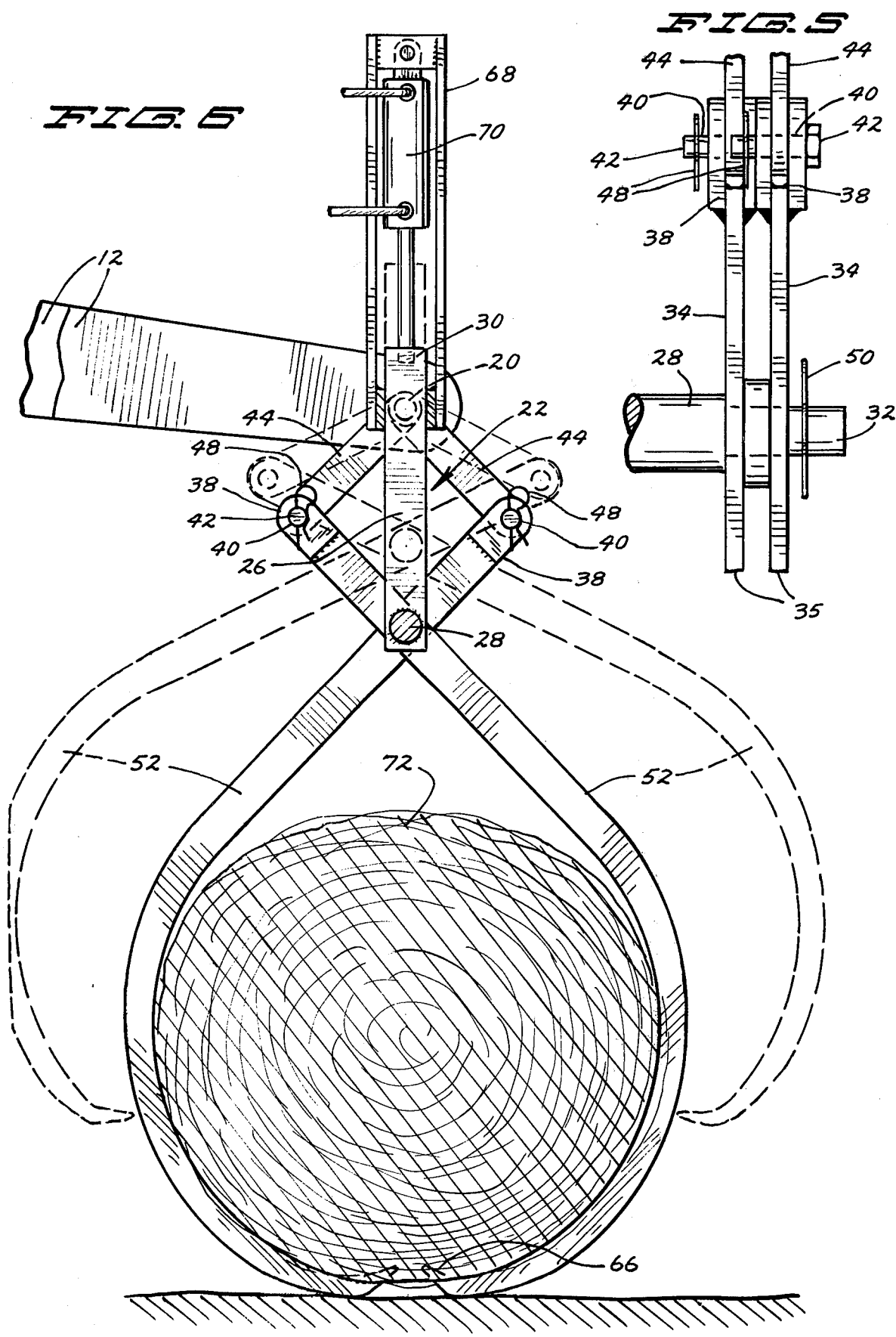

LOADER ATTACHMENT FOR HANDLING LOGS, BALES AND THE LIKE

BACKGROUND OF THE INVENTION

This invention has relation to a loader attachment including a grapple mounted on the front end loader support arms of a tractor.

In the logging industry and elsewhere, very sophisticated single purpose equipment has been developed to handle logs and other cylindrical-like objects such as very large bales. However, many farmers, for example, have need to handle logs and bales from place to place on an occasional basis which makes it economically difficult or impossible to own such equipment. They try to make do by using front each loader scoops and shovels and even bulldozer blades. Such means can be at least somewhat effective in pushing logs transversely from place to place, but is particularly ineffective where the logs are to be moved a considerable distance and, for example, deposited at a higher level than the level on which they are picked up.

The need is, then, for an attachment which can easily be fit into the regular mutually horizontally aligned front end loader pivot holes on the front end loader support arms of a tractor, can be used for its intended purposes, and can be quickly removed so that another and perhaps more conventional front end loader attachment can be easily reinstalled.

There is also a need for the grapple having hooks of one size forming jaws which can be easily replaced with another size to allow the handling of logs, for example, on the one hand and out-sized cylindrical bales on the other.

A search has been conducted in the United States Patent and Trademark Office in Class 214, subclasses 147G, 377, 379, 384, 620, and 650–654; as well as in Class 294, subclass 17.

A front end loader having a detachable bucket and having loader arms of the general type upon which the present invention can be attached is shown in U.S. Pat. No. 3,845,871, to DiLillo et al, and granted in November of 1974.

A patent showing the use of one set of hydraulic linear motors to fix the height of a lift fork, and another set of hydraulic motors to pivot hold-down fingers toward the lift fork is shown in U.S. Pat. No. 3,817,567 to Lull, granted in June of 1974.

A structure showing the use of a gravity operated log grapple on the end of a hydraulically activated boom is shown in U.S. Pat. No. 3,456,822 to Smith et al, granted in July of 1969.

Other patents cited, but not believed to be particularly pertinent are the following:

U.S. Pat. No. 2,873,874 to C. W. Best of et al, granted Feb. 17, 1959;

U.S. Pat. No. 3,613,923 to Albright, granted Oct. 19, 1971;

U.S. Pat. No. 3,477,598 to Hassell et al, granted Nov. 11, 1969;

U.S. Pat. No. 2,757,813 to Adams, granted Aug. 7, 1956; and

U.S. Pat. No. 2,760,663 to Tatum, granted Aug. 28, 1956.

IN THE DRAWINGS

FIG. 1 is side elevational view of the apparatus of one form of the invention showing its association with a tractor and with hydraulically operated front end loader support arms mounted on the tractor;

FIG. 2 is an enlarged front elevational view of the loader attachment of FIG. 1 showing fragments of the front end loader support arms;

FIG. 3 is a vertical view taken on the line 3—3 in FIG. 2;

FIG. 4 is a vertical sectional view taken on the line 4—4 in FIG. 2;

FIG. 5 is a fragmentary front elevational view of a portion of a hook support bar and upper portions of two hooks as seen to the right in FIG. 2; and FIG. 6 is also a vertical sectional view and is taken as if substantially on the line 4—4 in FIG. 2; but discloses a hydraulic means for activating the apparatus together with an alternate size hook for handling larger articles than logs such as bales.

DESCRIPTION OF PREFERRED EMBODIMENT

A tractor 10 is equipped with a pair of mutually parallel, spaced apart, front end loader support arms 12,12 of the kind customarily used to support a shovel or a scoop of a front end loader or to support a bulldozer blade. A pair of hydraulic, linear piston-cylinder motors 14,14 are pivotally mounted to the frame of the tractor and to the underside of the front end loader support arms in any usual or preferred manner, forming no part of the invention in and of themselves. These motors control the height of the outer ends of the loader support arms 12,12. Mutually aligned horizontal openings 16,16 are provided in outer ends of each of the support arms 12,12. Before the present invention, these openings normally received the pivot pins of the front end loader shovel or scoop or of a bulldozer blade; but in the present invention, they receive pivot bosses 18,18 of a main horizontal frame support bar 20 of a vertically extending loader attachment frame 22 of a loader attachment 24 made according to a first form of the invention as disclosed in FIGS. 1 through 5.

This vertically extending loader attachment frame 22 of the loader attachment 24 also includes a pair of open vertical U-shape guides 26,26 extending integrally downwardly from the main frame support bar 20.

A horizontal hook support bar 28 is situated in confined relationship within each of the vertical guides 26 in parallel relation to and below the frame support bar 20. A vertical hook support bar lifting strap 30 extends integrally upwardly from a center portion of the hook support bar 28 and is in sliding relationship with respect to the frame support bar 20. Outer ends of the horizontal hook support bar 28 are of reduced diameter as shown, and constitute horizontally outwardly extending hook pivot bosses 32,32. Four hooks 34 are situated, two on each of the hook support bosses 32, in facing relationship to each other to form two sets of jaws 35 and 36. An uppermost end portion 38 of each hook 32 is provided with an opening 40 to receive a hook-link pivot pin 42 which pivotally connects each such uppermost portion 38 with a separate link 44. Each link 44 is pivotally mounted with respect to the frame support bar 20 as at 46. While welded links are shown, it is to be understood that ears could extend outwardly from the support bar 20, and could be pinned to link 44 through the use of pivot pins like those shown at 42, for example. Lower ends of each hook can be provided with points or spikes or prongs 66.

As best seen in FIG. 5, each hook-link pivot pin 42 is kept in place by a spring key or clip 48 which allows the very rapid disassembling of the hooks 34 from the links 44 when a different size hook is to be used.

Similarly, the hook pivot bosses 32,32 on either end of the hook support bar 28 are maintained in pivotal relationship with respect to central portions of each of the hooks 34 by the instrumentality of spring keys or clips 50. This is also to facilitate removal of the books 34 and replacement with other hooks, for example the larger hooks shown at 52 in FIG. 6.

The hook support bar lifting strap 30 is provided with a pulley or sheave 54 rotatably mounted on an upper end thereof. A hook control crank arm 56 is pivotally mounted as at 58 to a support strap 59 extending upwardly from a support arm cross bracket 60 which extends between the front end loader support arms 12,12. The forward end of the hook control arm 56 extends underneath the sheave 54, and a control rod 62 extends from a rear portion of control arm 56 back to a location accessible to the driver of the tractor 10.

OPERATION OF FIRST FORM OF INVENTION

When it is desired to pick up a log such as log 64, control rod 62 will be pulled to cause control arm 56 to raise the pulley and consequently the hook support bar lifting strap 30 and the hook support bar 28, thus moving the center portions of each of the hooks 34 in upward direction causing the hooks to open to position as seen in FIG. 4, for example. With the jaws properly aligned with the log to be lifted, the motors 14,14 will be operated to lower front end loader support arms 12,12 and control rod 62 will be pushed forward to allow the hooks 34 to move underneath the log or into the log to pick it up. This positioning underneath the logs is best seen in full lines in FIGS. 1 and 3; although it is more likely that instead of sliding clear down underneath the log, the points or spikes 66 on each of the hooks 34 will actually enter the log through the bark at some position below the widest portion of the log (somewhat as indicated in dotted lines in FIG. 3.)

The motors 14,14 will then be activated to raise the loader support arms 12,12, and the tractor will be operated to move the log to its desired new location. When this location is reached, the loader support arms will again be lowered to cause the log to come into contact with the ground, thus releasing the hooks. The control rod 62 will be pulled at the same time thus feeding the hooks from the log. The loader support arms will be raised, and the tractor will be driven away from the log.

Referring now to FIG. 6, a somewhat modified structure of a second form of the invention is illustrated. All of the spring keys or clips 48 and 50 have been removed, the hooks 34 have been removed and have been replaced with larger hooks 52 and the spring clips reinstalled. This is a circumstance with would occur where larger objects such as cylindrical bales 72 are to be handled. These hooks 52 have also been provided with spikes or prongs 66.

Also in FIG. 6, a motor support bracket 68 has been integrally affixed to a central portion of the main horizontal frame support bar 20, and a hydraulic, linear, piston-cylinder motor 70 is connected between an upper portion of motor support bracket 68 and an upper portion of the vertical hook support bar lifting strap 30. The other parts can be identical with those described in connection with FIGS. 1 through 4 and 6 of the invention, and are identically numbered.

OPERATION OF A SECOND FORM OF THE INVENTION

The only difference in operation between the form of the invention as seen in FIG. 6 and the form of the other figures is that in the place of pulling on control rod 62, a hydraulic control valve (not shown) will be activated by the tractor driver to cause the linear motor 70 to contract, thus lifting the hook support bar 28 to cause the hooks to move from the position as seen in full lines in FIG. 6 to the position as seen in dotted lines. Then when the loader support arms 12,12 are lowered over the bale 72 (for example as seen in dotted lines in FIG. 6) the hydraulic motor 70 will be elongated thus allowing the hook arms to move underneath the bale 72 as seen in full lines in FIG. 6; or more likely, to dig into the bale at the position adjacent that shown in dotted lines.

To release the hooks from the bale after the lift has been completed, the loader attachment arms 12,12 will be lowered, thus causing the bale to force the hooks 52 apart, the hydraulic motor will be elongated sufficiently to hold the hooks apart at the position as seen in dotted lines in FIG. 6, and the tractor and loader attachment arms will be moved out of the area of the bale.

The embodiments of the invention in which an exclusive property or privilege is claimed are defined as follows:

1. A loader attachment for use with a prime mover having parallel, spaced apart, power actuated, front end loader support arms extending outwardly therefrom; said loader attachment including:
   a. a main horizontal frame support bar pivotally mounted in outer ends of said support arms;
   b. a pair of vertical guides extending downwardly from the said frame support bar in spaced relation to each other and symmetrically about the center of the frame support bar;
   c. a horizontal hook support bar extending through the vertical guides;
   d. two pairs of jaw-forming hooks, each having central portions pivotally supported, one pair at each end of said hook support bar in approximate vertical alignment beneath said frame support bar;
   e. a rigid link pivotally connecting an upper, outer end portion of each of said hooks with a vertically aligned portion of said frame support bar;
   f. a hook support bar lifting strap intergral with and extending upwardly from said hook support bar;
   g. said guides being of configuration to permit movement of said hook support bar between a first lower position wherein each of the hooks of each pair of hooks is in closed, adjacent relationship to the other hook of said pair of hooks, and a second upper position wherein said hooks are spaced at a maximum distance away from each other; and
   h. means for moving said hook support bar lifting strap to move said hook support bar between said first and said second positions.

2. The loader attachment of claim 1 wherein:
   a. said hooks are pivotally attached to opposite ends of said hook support bar by means of hook pivot bosses constituted as reduced outer cylindrical end portions of said horizontal hook support bar, and said hooks are retained on said pivot bosses by quick release springs clips; and
   b. said hooks are attached to said links through the instrumentality of hook-link pivot pins, and said pivot pins are retained in position through the instrumentality of quick release spring clips.

3. The loader attachment of claim 1 wherein said hook support bar lifting strap extends upwardly in adjacent relationship to said frame support bar and is slidably mounted with respect to it.

4. The loader attachment of claim 3 wherein said means to move said lifting strap includes a motor support bracket mounted on said frame support bar, and a linear motor connected between said motor support bracket and an upper portion of said lifting strap.

5. The loader attachment of claim 3 wherein the means for moving said lifting strap includes a hook control crank arm pivotally mounted with respect to the front end loader support arms and having a first end portion extending into contacting lifting relationship to said lifting strap, and means to rotate said crank arm to raise said lifting strap and hook support bar.

6. The loader attachment of claim 5 wherein the means to rotate said crank arm includes a control rod extending from a second end of said crank arm to a location adjacent an operator of the prime mover.

* * * * *

UNITED STATES PATENT AND TRADEMARK OFFICE
CERTIFICATE OF CORRECTION

PATENT NO. : 4,030,625
DATED : June 21, 1977
INVENTOR(S) : Edward L. Koehnen

It is certified that error appears in the above-identified patent and that said Letters Patent are hereby corrected as shown below:

Column 1, line 16, "each" should be --end--.

Column 1, line 55, after "Best" omit "of",

Column 2, line 6, after "vertical" insert --sectional--.

Column 2, line 10, after "fragmentary", insert --enlarged--.

Column 3, line 9, "books" should be --hooks--.

Column 3, line 48, "feeding" should be --freeing--.

Signed and Sealed this

Fourth Day of October 1977

[SEAL]

Attest:

RUTH C. MASON
Attesting Officer

LUTRELLE F. PARKER
Acting Commissioner of Patents and Trademarks